Nov. 29, 1955     H. W. BOTELER     2,725,211

DIAPHRAGM VALVE

Filed Jan. 16, 1951     4 Sheets-Sheet 1

FIG. I

INVENTOR.
HENRY W. BOTELER
BY
ATTORNEY

United States Patent Office 2,725,211
Patented Nov. 29, 1955

2,725,211

DIAPHRAGM VALVE

Henry W. Boteler, East Greenwich, R. I., assignor to Grinnell Corporation, Providence, R. I., a corporation of Delaware Application January 16, 1951, Serial No. 206,221

16 Claims. (Cl. 251—77)

This invention relates to improvements in a diaphragm valve. More especially it has to do with a valve of the type shown in United States Letters Patent No. 2,191,863 of February 27, 1940, having a thin sheet plastic diaphragm molded from an aliphatic base polymer and a thick flexible backing sheet therefor made of rubber-like material, and means operatively connecting the plastic diaphragm with the mechanism which effects the closing and the opening of the valve.

Valves of the type to which this invention relates have a body with a substantially straight passage therethrough which is interrupted by a transverse weir whose concave surface extends across the passageway and forms a seat for the diaphragm. The latter is clamped around its periphery between the body and a bonnet mounted thereon which houses most of the working parts by which the diaphragm is moved toward or away from the weir. At all times the diaphragm seals off these working parts from the material flowing through the passage or standing in the valve body.

When the valve is closed the diaphragm is bulged one way and held against the weir by a working part called the compressor which is provided with a set of spaced sections or fingers having contacting surfaces shaped to conform with the concave side of the diaphragm. When the compressor is withdrawn and the diaphragm is bulged the opposite way it seats against another set of fingers formed integrally on the bonnet, or provided by a finger plate, and shaped to conform to the then convex surface of the diaphragm. The two sets of fingers are so arranged that the fingers of one set are opposite the spaces between the fingers of the other set.

Heretofore the diaphragms used have been made of either natural or synthetic rubber compounds reinforced with fabric. The diaphragm has been attached directly to the compressor by a stud whose head is embedded in the diaphragm and whose shank screws into the bottom of the compressor. These rubber-like diaphragms although fairly thick have been desirably strong and satisfactorily flexible and valves using them have been extensively employed in the pulp and paper, chemical, synthetic rubber, food, beverage, textile, mining and other industries. But in pipe lines carrying certain chemicals, such as acids, alkalies or strong solvents, the diaphragms heretofore used have not been able to successfully resist the action of these chemicals.

It has been proposed to make a diaphragm wholly of some plastic which would be generally inert to most chemicals but this has not proven to be entirely possible. Because if such a plastic diaphragm is made thick enough to provide the necessary strength required it becomes too stiff to afford the required flexibility, and if made thin enough to be satisfactorily flexible it is not strong enough to stand up under continued use.

When such thick plastic diaphragms were substituted in place of the customary rubber-lik diaphragm and the valve was held closed for an appreciable period, it was found that the squeezing of the plastic diaphragm between the metal compressor and the metal weir resulted in a sort of cold flow of the plastic material and a permanent deformation of the diaphragm. It was noted that if the surfaces of the compressor or the arcuate weir happened to be unusually irregular, or if solid particles had become lodged on the surface of the weir and it became necessary to exert more pressure than would normally be required to seat tightly a rubber-like diaphragm, the concentration of such force along the weir surface would also deform and weaken the plastic diaphragm. It was also observed that when the plastic diaphragm was in a valve carrying a fluid under appreciable pressure the portions of the diaphragm pressed directly against the fingers of the compressor and against those on the bonnet or finger plate (depending upon the position of the valve) would be thinned while the portions of the diaphragm not in contact with the fingers would bulge into the spaces between them. As a result the diaphragm would lost its proper shape and could not subsequently be seated on the weir unless undue pressure were exerted through the compressor. And finally the usual stud embedded in the plastic diaphragm would cause marked deformation of the plastic in the area directly under the stud head because some of the closing force would be transmitted to the plastic through this stud. The consequent reduction of the thickness of the diaphragm would not only weaken it below the stud but would allow the stud to be moved away from the plastic above it and render the stud head loose in the diaphragm. As a consequence of all this the stud would in time be pushed through and ruin the diaphragm.

Recognizing the desirability of using a diaphragm which is chemically inert to most inorganic acids, alkalies and the like, as well as to many organic materials, it is an object of the present invention to provide a thin and satisfactorily flexible plastic diaphragm in novel conjunction with a strong resilient backing sheet interposed between the plastic diaphragm and the compressor. The forces exerted on the backing sheet by that portion of the compressor which is aligned with the arcuate weir when the compressor is moved toward the body are distributed by the backing sheet with substantial uniformity throughout the extent of that portion of the plastic diaphragm which engages the weir. This is true because while the compressor in traveling toward the weir exerts force in the direction of compressor movement, which force is not normal to the weir at all points thereacross, the rubber-like backing sheet material resolves this force into components substantially normal to the weir at all such points, and consequently a tight closure is achieved between the diaphragm and weir with very little abrading or scrubbing of the diaphragm. It is a further object of the invention to provide novel connecting means between the compressor and the plastic diaphragm which prevents the closing force exerted by the compressor from being applied directly to the plastic diaphragm but only indirectly to it through the resilient backing sheet. It is a feature of this connecting means, however, that the opening or withdrawing force exerted by the compressor is imposed solely on the plastic diaphragm thus insuring its positive withdrawal from the weir but without danger of injury to the plastic material, since the backing sheet likewise tends to absorb and distribute this lifting force. And finally when the valve is in any position the backing sheet is interposed between the plastic diaphragm and all the fingers, and thus prevents distortion of the plastic material by the pressure of the fluid flowing through the valve.

The best mode in which I have contemplated applying the principles of my improvements is shown in the accompanying drawings, but these are to be deemed merely illustrative for it is intended that the patent shall cover by suitable expression in the appended claims whatever features of patentable novelty reside in the invention disclosed.

Figure 1:
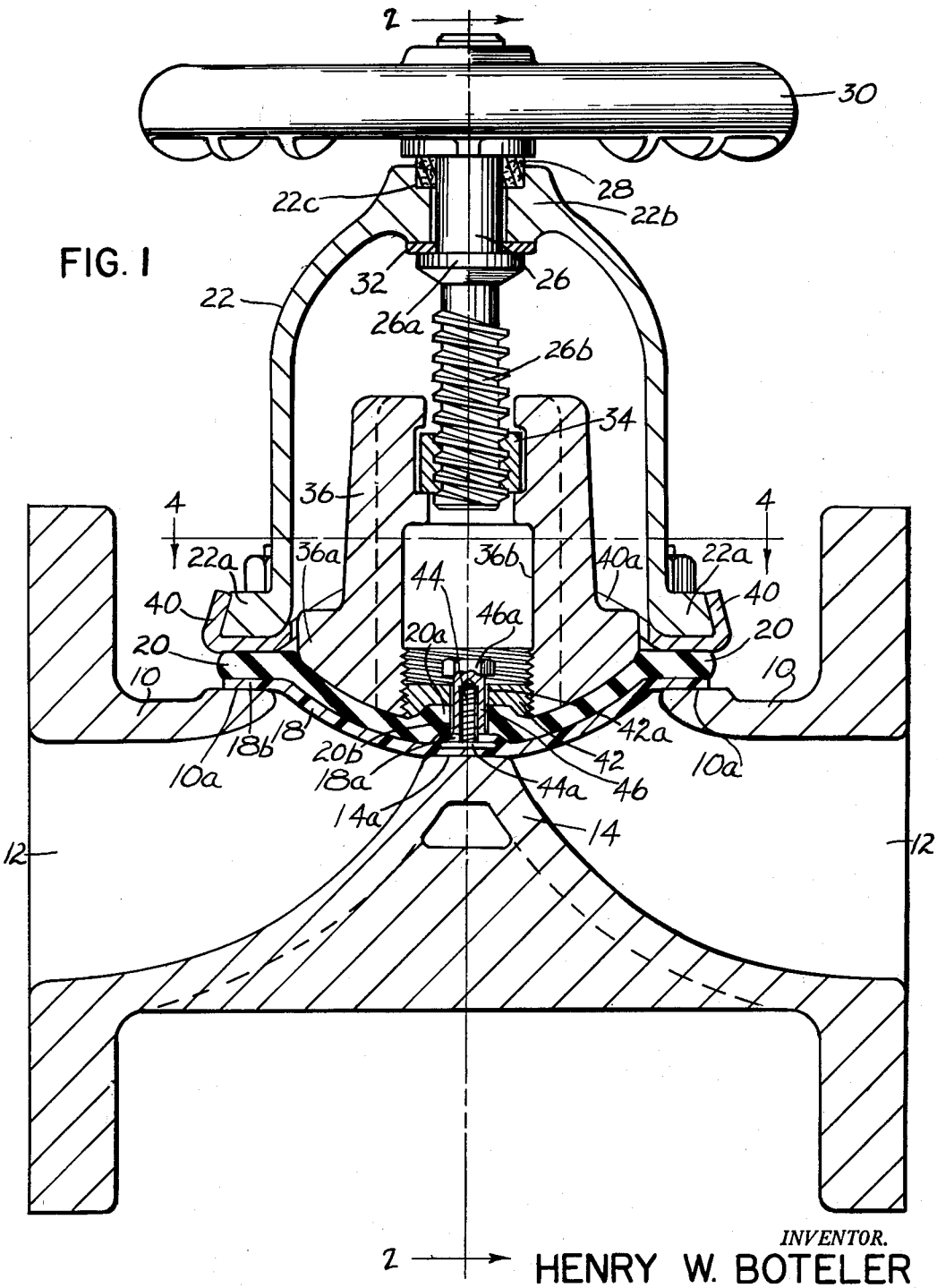
Fig. 1 is an elevation in section, as on line 1—1 of Fig. 2, of a diaphragm valve embodying my improvements, the valve being shown in closed position.

Referring now more particularly to the drawings, the diaphragm valve shown comprises a body 10 having a substantially straight passage or bore 12 therethrough. The bore is intersected by a shallow weir 14 whose top surface 14a is concave and forms a seat across the passage for a diaphragm 18.

This diaphragm is molded from an aliphatic base polymer. A plastic found quite satisfactory is polytrifluorochloroethylene. This plastic may be obtained in powdered form from the M. W. Kellogg Company of Jersey City, New Jersey, under the trade-name "Kel-F." When this powdered plastic is molded under proper temperature and pressure conditions a thin sheet diaphragm of the desired configuration is produced which is chemically inert to all inorganic acids, alkalies and the like with the exception of molten alkaline metals such as sodium. The diaphragm is also chemically inert to organic materials but may be plasticized or swelled slightly by halogenated organic materials. This plasticizing or swelling action is of minor consequence and in most uses of the diaphragm does not affect the operation of the valve. In addition to its resistance to chemical action this plastic has low cold flow and can be used with fluids having a wide range of temperatures.

Figure 2:
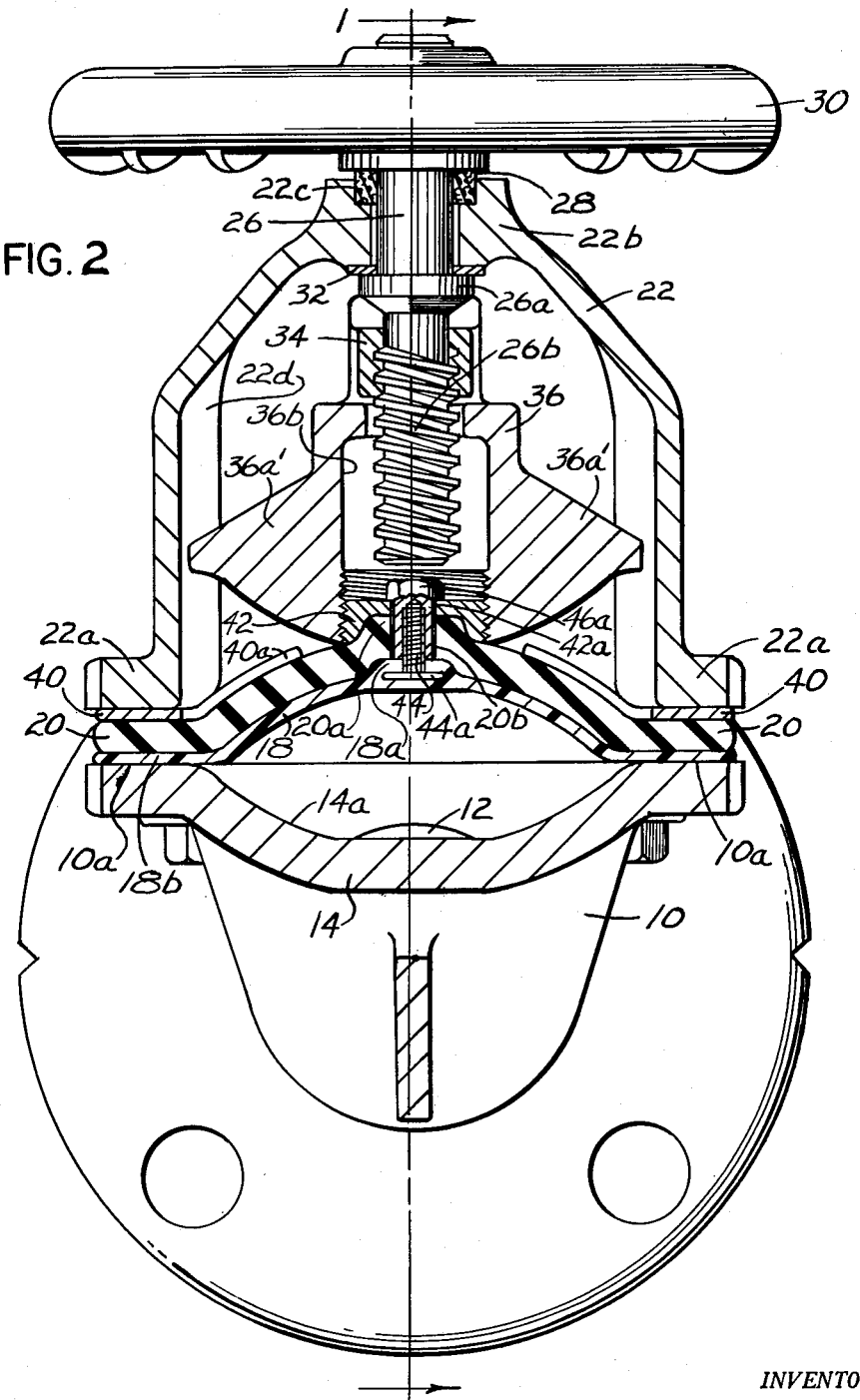
Fig. 2 is another elevation of the same, in section as on line 2—2 of Fig. 1, with the valve in the open position.

By molding this plastic as a relatively thin sheet—having a thickness of the order of .065"—and simultaneously shaping the greater portion of it in dished configuration, preferably as shown in Fig. 2, the resulting diaphragm is amply flexible to be repeatedly moved from its open or concave condition to its closed or convex condition. The central portion of the diaphragm is made thicker to provide a sort of hub 18a on the side opposite to the weir. The edge of the diaphragm is flat and overlies a flat seat 10a provided on the body at the edge of a hole whose axis is transverse to that of the passage 12.

A backing sheet 20, similar in over-all shape to that of the plastic diaphragm and made of rubber, rubber-like or other resilient material, is provided on the side of the diaphragm removed from the weir. This backing sheet is appreciably thicker than the plastic diaphragm 18 and at its central portion is recessed on one side to receive the hub 18a of the diaphragm and on the other side is made thicker to provide a hub 20a of its own. Its edge, together with the edge of the plastic diaphragm, is clamped to the body by an annular flange 22a at the bottom edge of a bonnet 22.

This bonnet extends away from the body and its top end 22b provides a bearing for a valve spindle 26, there being a washer 28 around the spindle set into a recessed seat 22c in the top surface of the bonnet. A handwheel 30 is secured to the portion of the spindle which extends beyond the bonnet and on the spindle within the bonnet is a suitable shoulder 26a which bears against a thrust washer 32 which in turn rests against the bonnet.

The spindle below the shoulder 26a has a threaded portion 26b which engages a nut 34 loosely held against rotation in a compressor 36. The lower portion of this compressor is provided around its edge with a set of fingers 36a spaced apart and having their bottom surfaces so shaped as to conform to the concave position of the backing sheet and diaphragm when the latter is seated on the weir as shown in Fig. 1. A diametrically disposed pair of these fingers 36a', arranged opposite to the weir are longer than the others so as to engage loosely in grooves 22d on the sides of the bonnet to keep the compressor from rotating and to effect a seal at the edges of the diaphragm next to the weir in the closed position.

Upon rotation of the handwheel in a clockwise direction the spindle 26 is rotated and since the nut 34 and compressor 36 can not rotate, both are moved downward toward the valve body to seat the diaphragm on the weir. Upon opposite rotation of the handwheel the nut, compressor, backing sheet and diaphragm are moved away from the weir until the backing sheet comes against another set of fingers 40a. These in some valves may be cast integrally with the bonnet but are here shown as parts of a finger plate 40 whose edge is clamped between the bonnet and the backing sheet. These fingers 40a are interspaced with respect to the fingers 36a on the compressor and are shaped to conform to the convex condition of the diaphragm and backing sheet when the diaphragm is in its open position.

It is a feature of my improvements that as the compressor is moved toward the body its force is imposed directly on the backing sheet only and that when the compressor is moved away from the body its withdrawing force is imposed solely on the plastic diaphragm. These results are attained by novel connecting means associated with the compressor, the backing sheet and the diaphragm.

Figure 4:
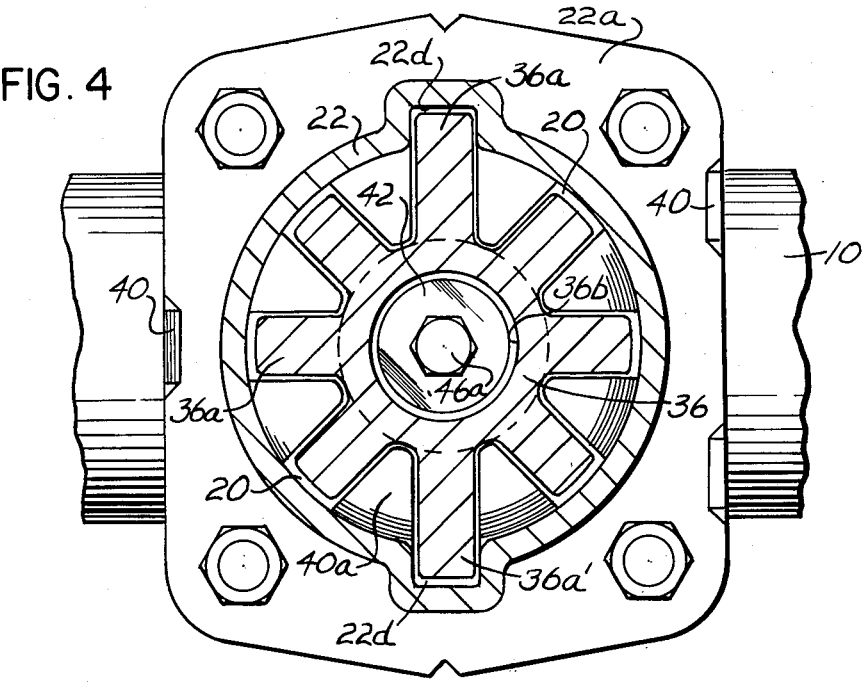
Fig. 4 is a plan view in section as on line 4—4 of Fig. 1.

In the form of the invention shown in Figs. 1, 2 and 4, the hollow central portion 36b of the compressor is threaded near its lower end to receive a washer 42 which has a flat top side and a formed underside matching the surface of the central portion 20a of the backing sheet. Indeed for this embodiment of the invention, this washer is used as part of the mold when the backing sheet is formed and during that process they are bonded tightly together.

A stud 44 has its head 44a embedded in the plastic diaphragm with its threaded shank extending outward through the hub 18a so as to project into a central hole 42a through the washer and another central hole 20b through the backing sheet. These holes are large enough for a tube nut 46 to be screwed onto the stud 44, the end of the tubular portion of the nut finally seating on the hub of the plastic diaphragm and clamping the latter between the lower edge of the tube nut and the head 44a of the stud.

The head 46a of the tube nut extends out beyond the edge of the central holes and overlies the washer 42, being spaced from the washer when the diaphragm is pressed against the weir as shown in Fig. 1. As the compressor moves away from the body the washer contacts the head 46a of the tube nut and since the latter is screwed onto the stud 44 the latter with the diaphragm is lifted away from the weir. It is to be noted that since the lower edge of the tube nut is tight against the hub 18a of the diaphragm the elements move as a unit with no bending or distortion of the plastic immediately adjacent the stud.

Comparison of Fig. 1 with Fig. 2 shows that when the compressor 36 is moved to close the valve the resilient backing sheet 20 is somewhat compressed where it is in contact with the central portion of the compressor and underneath its several fingers 36a. This deformation of the backing sheet serves to distribute the forces imposed by the compressor throughout the extent of the plastic diaphragm and prevents any deformation of the latter, such as might occur if the backing sheet were not present. In Fig. 2 with the valve open, the resilient backing sheet is shown in its normal state. If, however, there is a fluid flowing through the valve under appreciable pressure the dished portion of the diaphragm may be forced further away from the body and some of it on one side would be pressed into the spaces between the fingers 40a of the finger plate. Because of its resiliency the backing sheet is not injured thereby and the other side, adjacent to the diaphragm, is not appreciably deformed by the pressure so that the diaphragm is properly backed up and its distortion by the pressure prevented.

Figure 3:
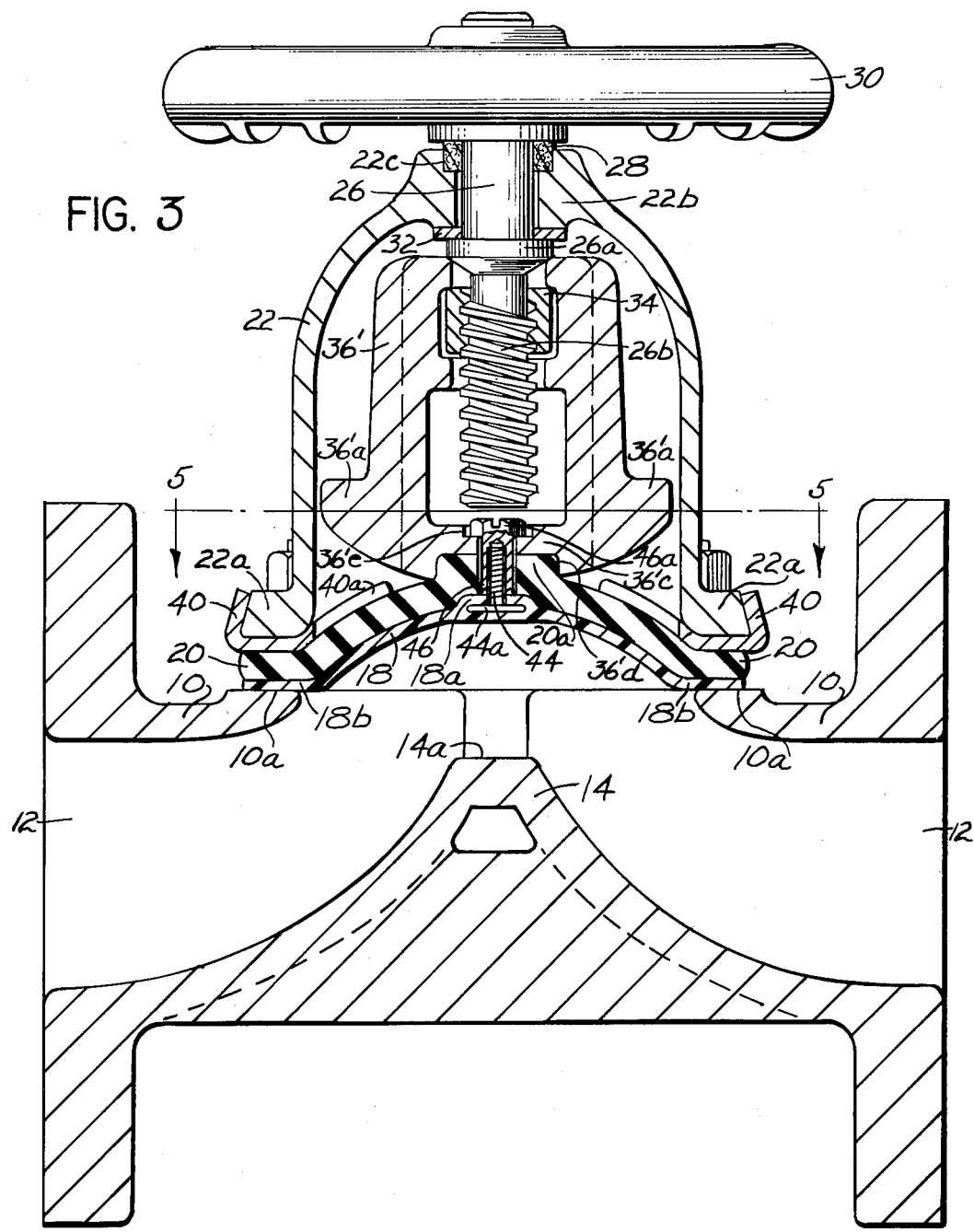
Fig. 3 is an elevation, like Fig. 1, showing a modification, but with valve in open position.
Figure 5:
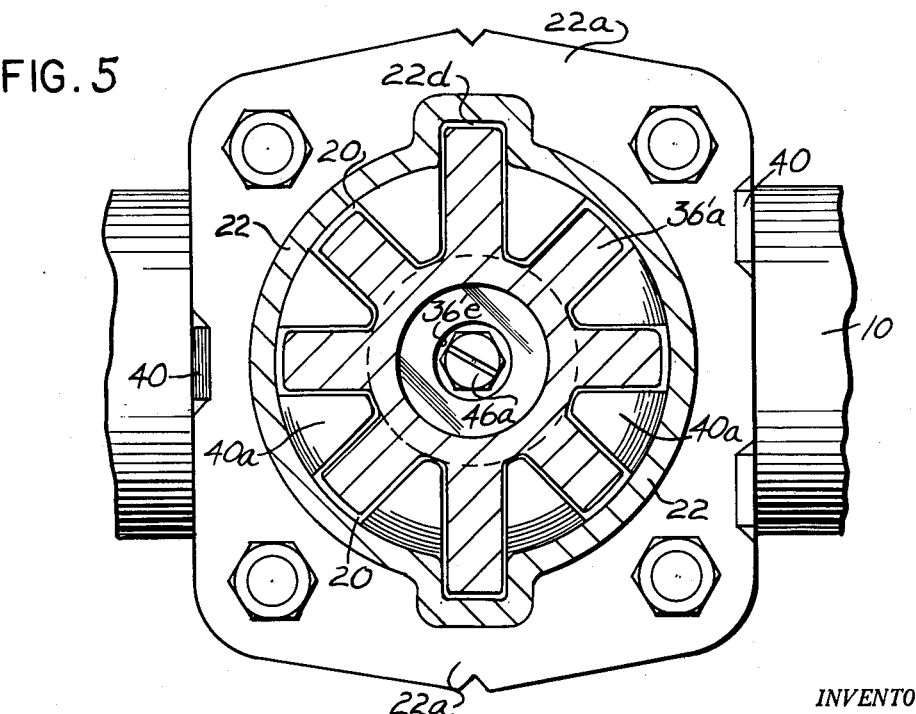
Fig. 5 is a plan view in section as on line 5—5 of Fig. 3.

In the modification of the invention shown in Figs. 3 and 5, the compressor 36' is cast with its central bottom portion 36'c integral. It has a recess 36'd to receive the hub 20a of the backing sheet and the upper side of the central bottom portion 36'c is also recessed at 36'e, probably by a machining operation, to provide a good seat for the head 46a of the tube nut. Otherwise the structures are identical and the mode of operation is the same.

I claim:

1. In a diaphragm valve comprising a body having a substantially straight passage therethrough intersected by a weir extending thereacross, with an inwardly curved surface forming a seat for a diaphragm, and comprising a bonnet secured to said body housing a compressor capable of being moved toward and away from the weir; a thin sheet diaphragm and a rubber-like backing sheet therefor with their edges clamped between the bonnet and the body, the said backing sheet being interposed between the diaphragm and the compressor and having a central hole therethrough, a stud with its head embedded in the diaphragm and with its threaded stem extending into said central hole, and a tube nut with its shank extending through a hole in said compressor and into said central hole in threaded engagement with said stud; the shank end of said tube nut seating on the diaphragm and the head of said tube nut being engaged by the compressor; the relative sizes of said holes and the shank of said tube nut being such that the force exerted by the compressor in moving toward the body is imposed solely on the backing sheet to effect seating of the diaphragm on said weir and the force exerted by the compressor in moving away from said body is imposed solely on the diaphragm by way of said tube nut and stud.

2. In a diaphragm valve comprising a body having a substantially straight passage therethrough intersected by a weir extending thereacross, with an inwardly curved surface forming a seat for a diaphragm, and comprising a bonnet secured to said body housing a compressor capable of being moved toward and away from the weir, having a threaded bore at one end with a washer having a central hole screwed into said bore; a thin sheet diaphragm and a thick rubber-like backing sheet with their edges clamped between the bonnet and the body, said backing sheet being interposed between the diaphragm and the compressor in bonded relation to said washer and having a central hole in register with the central hole in the washer, a stud with its head embedded in the diaphragm and with its threaded stem extending into said central holes, and a tube nut with its shank extending through said holes in threaded engagement with said stud; the shank end of said tube nut seating on the diaphragm and the head of said tube nut being engaged by the washer, the relative sizes of said central holes and the shank of said tube nut being such that the force exerted by the compressor in moving toward the weir is imposed solely on the backing sheet to effect seating of the diaphragm on said weir and the force exerted by the compressor in moving away from said weir is imposed solely on the diaphragm by way of said tube nut and said stud.

3. The combination in a diaphragm valve having a body with a weir disposed transversely to a flow passageway therethrough and with an opening opposite said weir, and having a bonnet secured to said body and housing a compressor movable toward and away from said weir, of a thin flexible aliphatic base polymer diaphragm and a separate and relatively thick rubber-like backing sheet therefor having their edges clamped between said body and said bonnet and extending unfolded across said opening, said diaphragm having means connected thereto which are engaged by said compressor to pull said diaphragm away from said weir when said compressor is moved to open the valve and which are disengaged from said compressor when said compressor is moved to close the valve; the said backing sheet being interposed between said compressor and said diaphragm and having a hole through which a portion of said connecting means loosely extends so that when said compressor is moved to close the valve the force exerted by said compressor is imposed directly only on the backing sheet and thereby distributed uniformly throughout the extent of the diaphragm.

4. In a diaphragm valve comprising a body having a substantially straight passage therethrough intersected by a weir extending thereacross, an opening opposite said weir, a bonnet secured to said body and housing a compressor capable of being moved toward and away from said weir, a thin flexible aliphatic base polymer diaphragm, a thick rubber-like backing sheet therefor, both said diaphragm and said backing sheet having their edges clamped between the bonnet and the body and extending unfolded across said opening, the said backing sheet being interposed between the diaphragm and the compressor and having a central hole therethrough, a stud with its head embedded in the diaphragm and with its threaded stem extending into said central hole, and a tube nut with its shank extending through a hole in said compressor and into said central hole in threaded engagement with said stud; the shank end of said tube nut seating on the diaphragm and the head of said tube nut being engageable by the compressor; the relative sizes of said holes and the shank of said tube nut being such that the force exerted by the compressor in moving toward the weir is imposed solely on the backing sheet to effect seating of the diaphragm on said weir and the force exerted by the compressor in moving away from said weir is imposed by way of said tube nut and stud solely on the diaphragm.

5. In a diaphragm valve comprising a body having a passage therethrough and a seat, a bonnet secured to said body housing a stem and a compressor, means operatively interconnecting said compressor with said stem for movement of said compressor toward and away from said seat, a diaphragm interposed between said compressor and said seat and having its periphery clamped between said bonnet and said body, movement of said compressor toward said seat positively effecting seating of the diaphragm on said seat, a stud embedded in said diaphragm, and lost motion connection means between said stud and said compressor operative to cause the movement of said compressor to be transmitted to the diaphragm through the connection means only upon movement of said compressor away from said seat.

6. In a diaphragm valve comprising a body having a passage therethrough and a seat, a bonnet secured to said body housing a stem and a compressor, means operatively interconnecting said compressor with said stem for movement of said compressor toward and away from said seat, a diaphragm interposed between said compressor and said seat and having its periphery clamped between said bonnet and said body, movement of said compressor toward said seat positively effecting seating of the diaphragm on said seat, a stud having a portion embedded in said diaphragm and another portion extending from said embedded portion towards said compressor, and lost motion connection means between said stud and said compressor, said lost motion connection means providing a force transmitting connection between said compressor and said stud to move the diaphragm away from said seat when said compressor is moved away from said seat, and said lost motion connection means being incapable of providing a force transmitting connection between said compressor and said stud to move the diaphragm toward said seat when said compressor is moved toward said seat.

7. In a diaphragm valve comprising a body having a passage therethrough and a seat, a bonnet secured to said body housing a stem and a compressor, means operatively interconnecting said compressor with said stem for movement of said compressor toward and away from said seat, a diaphragm assembly comprising at least an imperforate diaphragm central portion which is interposed between said seat and said compressor and which has integral with its periphery an annular portion clamped between said bonnet and said body, said compressor engaging said assembly and solely by said engagement forcing said diaphragm into firm contact with said seat when the compressor is moved toward said seat, a stud having a first portion embedded in said diaphragm and having a second portion extending out of said diaphragm toward said compressor, and lost motion connection means between said second stud portion and said compressor which engage both said second stud portion and said compressor upon movement of said compressor a predetermined distance away from said diaphragm and which fails to engage both said second stud portion and said compressor upon movement of said compressor to a position wherein the distance between said compressor and said diaphragm is less than said predetermined distance.

8. In a diaphragm valve comprising a body having a passage therethrough and a seat, a bonnet secured to said body housing a stem and a compressor, means operatively interconnecting said compressor with said stem for movement of the compressor in one direction toward said seat and in the opposite direction away from said seat, a diaphragm assembly comprising at least an imperforate diaphragm which is interposed between said seat and said compressor and which has its periphery clamped between said bonnet and said body, said compressor engaging said assembly and solely by said engagement forcing said diaphragm into firm contact with said seat when the compressor is moved in said one direction, a stud having a first portion embedded in said diaphragm and having a second integral portion extending out of said diaphragm on the side thereof adjacent the compressor, and lost motion connection means between said second stud portion and said compressor which limit to a predetermined distance the movement of said compressor away from said diaphragm in said one direction and which provide a firm engagement between said compressor and said second stud portion upon further movement of said compressor in said one direction, said lost motion connection means failing to limit the movement of said compressor toward said diaphragm to said predetermined distance upon movement of said compressor in said opposite direction.

9. In a diaphragm valve, a seat, diaphragm means, a compressor for advancing toward said seat to move said diaphragm means toward and into engagement with said seat, for further advancing toward said seat to squeeze said diaphragm means thereagainst after said engagement to sealingly close the valve, and for withdrawing said diaphragm means away from said seat to open the valve, said diaphragm means having a substantially rigid member associated therewith, and means for operatively connecting said rigid member with said compressor, said last mentioned means including means for providing lost-motion between said rigid member and said compressor during at least a portion of said further advancing of the compressor.

10. In a diaphragm valve, a valve seat, diaphragm means, a compressor for moving toward and away from said seat to move said diaphragm means between seat engaging and seat remote positions and for further moving toward said seat to sealingly close the valve after engagement of said seat by said diaphragm means, connecting means for operatively connecting said diaphragm means with said compressor to effect opening movement of said diaphragm means by movement of said compressor away from said seat, said connecting means including means for providing relative movement between said compressor and said connecting means during at least a portion of said further movement of said compressor.

11. A diaphragm valve according to claim 10 wherein at least a portion of said diaphragm means in resilient and said diaphragm means includes a section located between said connecting means and said seat, and wherein said compressor, connecting means and diaphragm means are so constructed and arranged that the major portion of the force which is exerted on said section by the compressor in moving the diaphragm means between its seat engaging and valve closing positions is exerted through said diaphragm means.

12. A diaphragm valve according to claim 11 and wherein said further movement of the compressor exerts a squeezing force on the seat remote side of said diaphragm means which compresses said resilient diaphragm means portion, and wherein said connecting means has a compressor engaging portion adapted to be engaged by a connecting means engaging portion of said compressor during the movement of said compressor away from said seat after said compression has been at least partly released to drive said diaphragm means out of seating engagement with said seat, said connecting means engaging portion of said compressor being adapted to move away from said compressor engaging portion of said connecting means during at least the final portion of that part of said squeezing movement of said compressor when said resilient portion is being compressed.

13. A diaphragm valve according to claim 12 wherein said diaphragm means has a seat-adjacent plastic, chemical and temperature resistant facing and a backing made from a material more resilient than said plastic, wherein said connecting means has one end embedded in said facing and extends through an aperture in said backing and into an aperture in a portion of said compressor, such apertures being large enough to permit relative movement between the walls of said apertures and the portion of said connecting means passing therethrough and thereinto, the other end of said connecting means comprising a shoulder facing said seat, said shoulder being adapted to be engaged by a shoulder on said compressor facing away from said seat, whereby movement of said compressor away from said seat causes the shoulder of said compressor to engage the shoulder of said connecting means with consequent movement of said diaphragm means away from said seat, said shoulder of said compressor being movable with said compressor toward said seat and away from the shoulder of said connecting means at least during the final portion of that part of said closing movement of said compressor when said resilient portion is being compressed.

14. A diaphragm assembly comprising a plastic facing for exposure to fluids, preformed backing sheet means relatively thicker and more resilient than said facing and in juxtaposed relationship with one side of said facing, said facing having a peripheral portion adapted to be clamped and an imperforate central portion bounded by said peripheral portion, said central portion having a thickened section providing a hub on said one side thereof facing said backing sheet means, said preformed backing sheet means having a surface complementary to said one side of said facing and having a recess complementary to said hub and having an aperture therein at said recess, means extending through said aperture for mechanically interlocking the facing with the backing sheet means for coupled movement thereof, said last mentioned means including means embedded in said hub and being exposed at the backing sheet means-adjacent side only of said facing.

15. A diaphragm assembly according to claim 14 wherein said plastic facing comprises polytrifluorochloroethylene.

16. A diaphragm assembly according to claim 14 wherein said embedded and exposed means includes a portion extending through said aperture, and said aperture is defined by a wall spaced from said portion by a predetermined amount, whereby an element cooperative with said portion can be attached thereto in such manner as to clamp a portion of the facing between said embedded means and element.

References Cited in the file of this patent

UNITED STATES PATENTS

| | | |
|---|---|---|
| 1,470,352 | Dubbs | Oct. 9, 1923 |
| 1,783,281 | Cox | Dec. 2, 1930 |
| 1,858,470 | Sloan | May 17, 1932 |
| 2,186,833 | Iler | Jan. 9, 1940 |
| 2,394,243 | Joyce | Feb. 5, 1946 |
| 2,416,061 | McAlevy | Feb. 18, 1947 |
| 2,654,559 | Franck | Oct. 6, 1953 |

FOREIGN PATENTS

| | | |
|---|---|---|
| 434,665 | Great Britain | 1935 |
| 578,168 | Great Britain | 1946 |

OTHER REFERENCES

New Products and Materials in Chemical Engineering, April 1950, page 164.

Plastics Bulletin: Volume 11, No. 44, 1939, pages 173–178.

"The Polythene Story," published by E. I. du Pont de Nemours Co., Plastics Dept., Wilmington, Del.